M. A. TINKER.
Washing-Machine.

No. 8,892. Reissued Sept. 9, 1879.

Witnesses:

W. W. Hollingsworth
Amos W. Hart

Inventor:

M. A. Tinker
By Munn & Co
Attorneys

N. PETERS, PHOTO-LITHOGRAPHER, WASHINGTON, D. C.

UNITED STATES PATENT OFFICE.

MELVIN A. TINKER, OF FAIRFIELD, ILLINOIS.

IMPROVEMENT IN WASHING-MACHINES.

Specification forming part of Letters Patent No. 218,087, dated July 29, 1879; Reissue No. 8,892, dated September 9, 1879; application filed August 15, 1879.

*To all whom it may concern:*

Be it known that I, MELVIN A. TINKER, of Fairfield, in the county of Wayne and State of Illinois, have invented a new and useful Improvement in Washing-Machines; and I do hereby declare that the following is a full, clear, and exact description of the same.

The invention is an improvement in the class of washing-machines composed of rolls held in yielding contact by means of springs, the bed-rollers being arranged in the arc of a circle and inclosed or covered by an endless apron.

The invention relates to the construction and arrangement of parts hereinafter described and specifically claimed.

Figure 1:
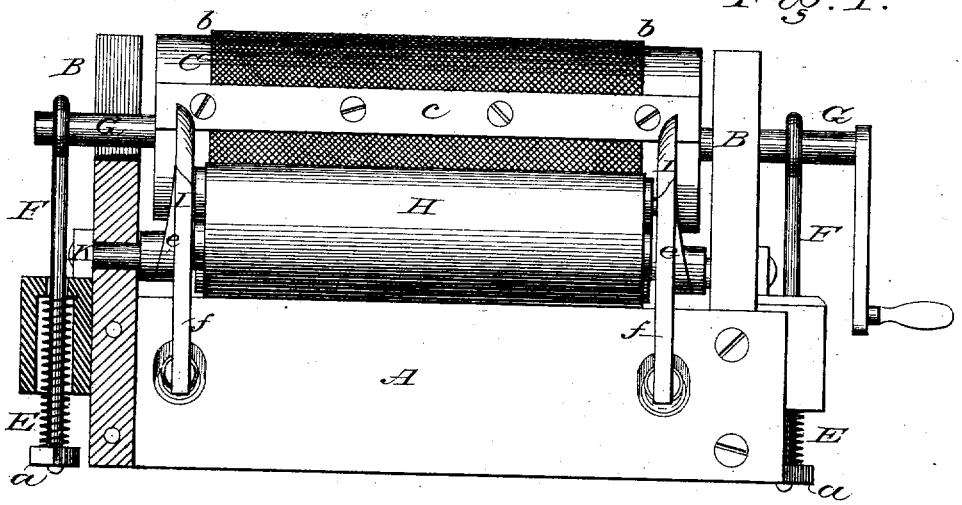
Figure 2:
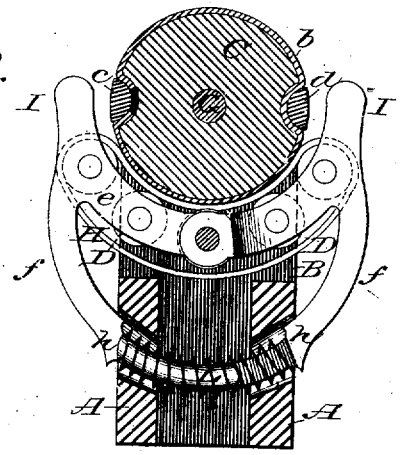

In the accompanying drawings, forming part of this specification, Figure 1 is a side view, partly in section, and Fig. 2 a vertical section, of the machine.

The frame of the machine consists of the horizontal base A and slotted uprights B, which are rigidly connected together. The large or main roll C has its bearings in the slotted uprights B, and is held down on the concave bed, formed of small rolls D, by means of springs E, applied to rods F, which are attached to the crank-shaft G of the larger roll, C, and pass through blocks attached to the base A.

By adjusting the screw-nuts *a* on the lower ends of said rods F, the pressure of roll C on the concave bed may be quickly changed, and by unscrewing the nuts the roll may be detached from the machine. Said roll is covered with a tightly-fitting non-elastic fabric, *b*, whose ends are secured in a lengthwise groove in the roll by means of a clamp-bar, *c*. This bar is secured in the groove by screws, so that its outer side is flush with the periphery of the roll, and another bar, *d*, is similarly secured in a groove on the opposite side of the roll, thus pressing the middle portion of the fabric into the groove and stretching it tightly around the roll.

The covering *b* is what is known as "saddlers' stretching-web," and, having no appreciable elasticity, it will not stretch and wrinkle like cloth when wet, but remain closely fitted to the roll.

An endless cloth apron, H, is applied to the small rolls D in the usual way. Said rolls are journaled in the curved upper arms, *e*, of levers I, and have longer curved arms, *f*, extending downward and inward from their outer ends. The upper arms, *e*, are hinged on the rod K, which extends between the uprights B, and the ends of the lower arms, *f*, of the opposite levers lap on each other and are encircled by a spiral spring, L. A shoulder, *h*, is formed on the arms *f* a short distance from their ends, against which the spring L presses, as shown.

By this construction I avoid the necessity of providing a separate spring for each lever, besides securing greater elasticity.

What I claim is—

1. The combination, with the roll C, having two lengthwise grooves, of the fibrous covering *b*, clamp-bar *c*, for securing the ends of the covering, and the stretching-bar *d*, applied to the middle portion of the covering, as shown and described.

2. The combination, with the rolls forming the concave bed and the fulcrum-rod K, of the angular levers I, having shoulders formed on their curved lapped arms *f*, and the springs L, applied to the latter, as shown and described.

The above specification of my invention signed by me this 4th day of August, A. D. 1879.

MELVIN A. TINKER.

Witnesses:

C. B. RIDER,

A. B. RIDER.